Feb. 24, 1959  O. BÖHME ET AL  2,875,225
PRODUCTION OF ISOCYANATES
Filed June 24, 1954
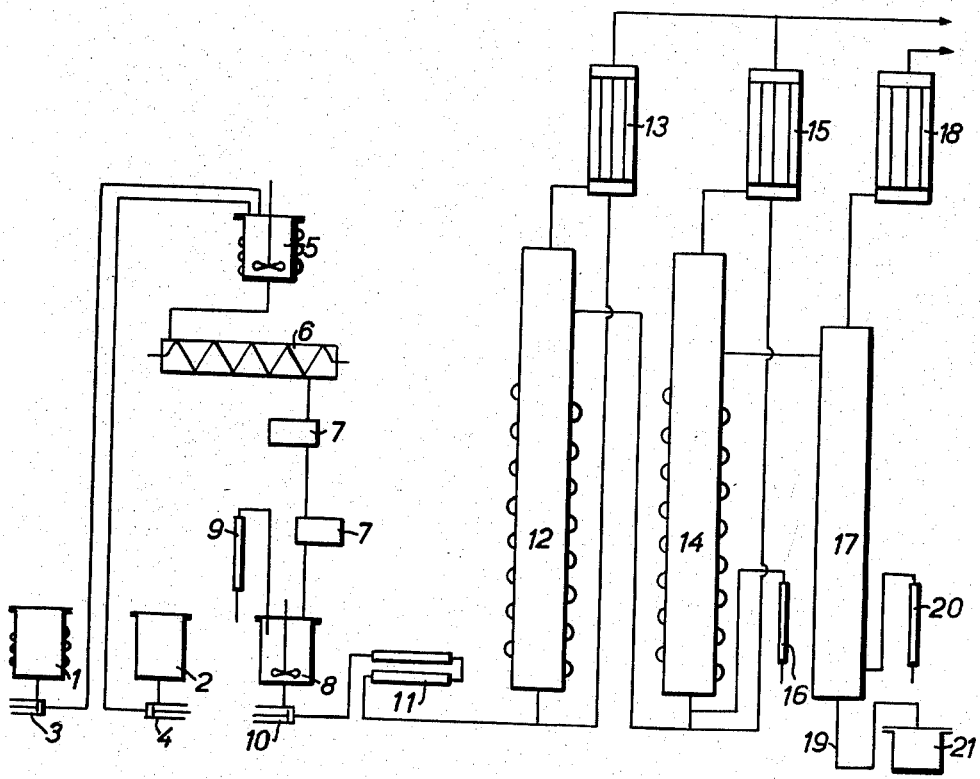
INVENTORS:
OTTO BÖHME, FRIEDRICH MOTT, JOHANNES PFIRSCHKE, HEINZ WOLLTHAN,
BY
*Burgess and Dinklage*
ATTORNEYS États-Unis Patent Office 2,875,225
Patented Feb. 24, 1959

2,875,225

PRODUCTION OF ISOCYANATES

Otto Böhme, Opladen, Friedrich Mott and Johannes Pfirschke, Leverkusen-Bayerwerk, and Heinz Wollthan, Leverkusen, Germany, assignors to Farbenfabriken Bayer Aktiengesellschaft, Leverkusen, Germany, a corporation of Germany Application June 24, 1954, Serial No. 438,912

Claims priority, application Germany June 25, 1953

2 Claims. (Cl. 260—453)

This invention relates to an improvement in the production of aromatic isocyanates and is more particularly concerned with a continuous process which is suitable for the production of aromatic isocyanates on a large scale.

It is well known to produce aromatic isocyanates by reacting aromatic amines with phosgene. In carrying out this reaction, a phosgene solution prepared from phosgene and an inert solvent at about 0° C. and an amine solution prepared from an aromatic amine and an inert solvent at about 70°–80° C. are contacted by adding the hot amine solution to the phosgene solution while stirring and cooling with ice and salt (so-called cold phosgenation). The mixture thus obtained is heated to a temperature within the range of 50°–200° C. while introducing phosgene and stirring to thereby finish the phosgenation (so-called hot phosgenation). Then the phosgene dissolved in the reaction mixture is removed by passing in an inert gas such as nitrogen or carbon dioxide, and the reaction mixture is worked up by distillation.

The prior art process must be operated discontinuously. Another disadvantage is that a large amount of liquid phosgene is required to effect the so-called cold phosgenation, which phosgene escapes partly in the form of gaseous phosgene during the heating of the reaction mixture in the hot phosgenation step. It is therefore impossible to carry out this process on a large scale, the large amount of gaseous phosgene evolved in the reaction being too dangerous for commercial operation. A further drawback to the known process is that the recovery of the phosgene has to be carried out intermittently.

It is an object of the present invention to provide a process for the production of aromatic isocyanates which may be operated continuously. Another object is to provide a process for the manufacture of aromatic isocyanates which may be carried out on a large scale. Further objects will appear hereinafter.

These objects are attained in accordance with the present invention by continuously preparing a suspension of an aromatic amine in an inert solvent, continuously reacting this suspension with phosgene in the cold, passing the mixture thus obtained in a continuous stream from the lower part to the upper part of a tower which is set up vertically or at an oblique angle and heated to a temperature within the range of about 50° C. to about 200° C., treating the mixture thus obtained with an inert gas in a column to thereby remove the excess phosgene dissolved therein, and recovering an aromatic isocyanate from the reaction mixture.

The suspension of the amine required for the process of the invention may be prepared in any suitable manner. Thus, the amine may be dissolved in the diluent and the solution thus obtained may be cooled in a suitable apparatus such as screw cooler, wherein the greater part of the amine crystallizes. The mixture thus obtained (comprising the crystals and the mother liquor) may be ground in any suitable apparatus such as a colloid mill so that particles of an average size of about 10–50μ are obtained. Alternatively, the solid amine may be broken up into pieces and then ground with the diluent to form a fine suspension.

The use of a cold suspension of the amine, in place of a hot solution thereof, has the advantage that the product obtained in the reaction with phosgene in the cold constitutes a thin paste which may be pumped. This feature is of considerable importance since it allows the phosgenation to be conducted continuously.

The invention will be better understood by reference to the flow diagram shown in the drawing.

Referring to the drawing, the system illustrated therein essentially comprises the containers 1, 2, 5 and 21, screw cooler 6, colloid mill 7, reactor 8, preheater 11, the towers 12 and 14, column 17, the coolers 13, 15 and 18, the rotameters 9, 16 and 20, and the pumps 3, 4 and 10.

In operation, the aromatic amine serving as the starting material and an inert solvent, are pumped from container 1 and 2, respectively, to container 5, where a hot solution of the amine in the inert solvent is formed. The solution thus obtained is fed to screw cooler 6 in which the greater part of the amine crystallizes. The crystals and the mother liquor flow to colloid mill 7 and the fine suspension formed therein is fed to reactor 8 along with phosgene which is introduced via rotameter 9. In reactor 8 the so-called cold phosgenation takes place. The reaction mixture is pumped through preheater 11 into tower 12 serving as the hot phosgenation reactor. The reaction mixture leaving the top of tower 12 is fed to the bottom of tower 14 along with gaseous phosgene introduced via rotameter 16. In tower 14 the hot phosgenation is finished. The solvent vapors formed in the towers 12 and 14 are condensed in coolers 13 and 15 and recycled to the bottom of towers 12 and 14, respectively. The reaction mixture leaving tower 14 flows to column 17, where it is contacted countercurrently with a stream of an inert gas introduced into the bottom of column 17 via rotameter 20. The reaction mixture freed of dissolved phosgene is stored in container 21. The solvent vapors formed in column 17 are condensed in reflux cooler 18. The phosgene contained in the exit gases which leave the coolers 13 and 15 is recovered in a recovery unit.

The increase in the yield and in the production rate in terms of isocyanate produced per unit volume of reaction space make the process of the invention particularly economical.

The invention is further illustrated by the following typical example of a specific embodiment thereof.

*Example*

Referring to the drawing, container 1 maintained at a temperature of about 105°–110° C. is filled with toluylenediamine (mixture of 1,2,4- and 1,2,6-toluylenediamine) serving as the starting material. Container 2 is filled with o-dichlorobenzene serving as the inert diluent. By means of pumps 3 and 4 122 kilograms per hour of the melted amine and 450 kilograms per hour of o-dichlorobenzene are pumped into heated vessel 5, wherein the components form a solution having a temperature of about 70°–80° C. Via a siphon the solution flows into screw cooler 6, wherein it is cooled to about 0° C. The crystals formed in screw cooler 6 are fed along with the mother liquor to colloid mill 7 in which they are ground to form a fine suspension that flows in a continuous stream into vessel 8 maintained at a temperature of 0°–5° C., wherein the cold phosgenation takes place. The phosgene required for the reaction amounts to 265 kilograms per 1 hour and is fed in the liquid state via rotameter 9 into vessel 8. By means of pump 10 located at the bottom of vessel 8 and adjusted so as to maintain a certain level in vessel 8 the reaction mixture is fed to preheater 11 where it is heated to about 30° C. From preheater 11 the mixture flows to tower 12, comprising a stainless steel tube about 20 ft. in length and 20 in. in diameter, which is filled with Raschig rings. In tower 12 which is surrounded by a heating coil the mixture is heated to about 170° C. At the top of tower 12 excess phosgene, hydrogen chloride, and solvent vapors are evolved which are condensed in cooler 13. While the condensed solvent is recycled to the bottom of the tower the phosgene containing gases are fed to the phosgene recovery unit or destroyed. The reaction mixture flows via a siphon to the bottom of tower 14 co-currently with 40–50 kilograms per 1 hour of gaseous phosgene which are fed to the bottom of tower 14 via rotameter 16. The gases leaving tower 14 are passed into cooler 15 where the solvent vapors are condensed. The exit gases are combined with those from tower 12. The reaction mixture leaving tower 14 is fed to column 17 in which it is contacted countercurrently with a stream of hot nitrogen (about 5 cubic meters per 1 hour at standard conditions) which is introduced via rotameter 20. The phosgene dissolved in the reaction mixture is thereby removed. The reaction mixture is then fed via siphon 19 to container 21 from which it flows to a distillation column. The exit gases leaving column 17 are passed through cooler 18 in order to condense solvent vapors. The condensate flows back to the top of column 17.

The yield amounts to 85–87% of the theoretical.

We claim:

1. A process for the continuous production of aromatic isocyanates, which comprises substantially continuously contacting a suspension of an aromatic amine having an average particle size below about $50\mu$ in an inert suspending agent with phosgene at a temperature between about 0 and 10° C., passing the mixture obtained upwardly through a substantially vertically extending reaction zone maintained at a temperature between about 100 and 175° C., thereafter removing the excess phosgene dissolved in the mixture in an inert gas stream, and recovering the aromatic isocyanates formed.

2. A process in accordance with claim 1, in which the particles of said aromatic amine in said suspension have an average size of about $10-50\mu$.

References Cited in the file of this patent

UNITED STATES PATENTS 2,680,127 Slocombe et al. _____ June 1, 1954

FOREIGN PATENTS 516,296 Canada _____ Sept. 6, 1955